US008106819B1

(12) United States Patent
Rahman et al.

(10) Patent No.: US 8,106,819 B1
(45) Date of Patent: Jan. 31, 2012

(54) OPTIMIZING PERFORMANCE OF MULTIPLE LOCATION BASED SERVICE APPLICATIONS THAT ARE RUNNING EITHER ALONE OR SIMULTANEOUSLY ON A WIRELESS DEVICE

(75) Inventors: Iftekhar Rahman, Billerica, MA (US); Kala Narayanan, Edison, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 12/982,462

(22) Filed: Dec. 30, 2010

(51) Int. Cl.
*G01S 19/03* (2010.01)
*H04W 24/00* (2009.01)

(52) U.S. Cl. .................... 342/357.4; 455/456.2

(58) Field of Classification Search .............. 342/357.4; 455/456.1, 456.2
See application file for complete search history.

(56) References Cited

U.S. PATENT DOCUMENTS

| 7,069,023 | B2 * | 6/2006 | Maanoja et al. ........... 455/456.1 |
| 7,088,237 | B2 * | 8/2006 | Arcens ..................... 340/539.13 |
| 7,224,983 | B2 * | 5/2007 | Budka et al. ............... 455/456.1 |
| 7,428,571 | B2 * | 9/2008 | Ichimura ....................... 709/203 |
| 2006/0030337 | A1 * | 2/2006 | Nowak ....................... 455/456.2 |
| 2007/0021125 | A1 * | 1/2007 | Zhu et al. ................... 455/456.1 |
| 2010/0169003 | A1 * | 7/2010 | Van Der Meer ............. 701/207 |

* cited by examiner

*Primary Examiner* — Thomas Tarcza
*Assistant Examiner* — Cassie Galt

(57) ABSTRACT

Requests for location fix for a mobile device are received from one or more Location Based Service (LBS) applications. The received requests are queued in a First In First Out (FIFO) queue in the mobile device. Based on information in a first request out of the FIFO queue, the mobile device runs a location engine in a first fix mode to obtain a fix on the location of the mobile device for a response to the first request. While the location engine is running to obtain the fix for the response to the first request, the mobile device analyzes information in a second request in the FIFO queue, to determine a second fix mode for response to the second request. Based on a comparison of the second fix mode to the first fix mode, the mobile device may change the information in the second request to correspond to the first fix mode, before output of the second request from the FIFO queue to the location engine.

21 Claims, 3 Drawing Sheets

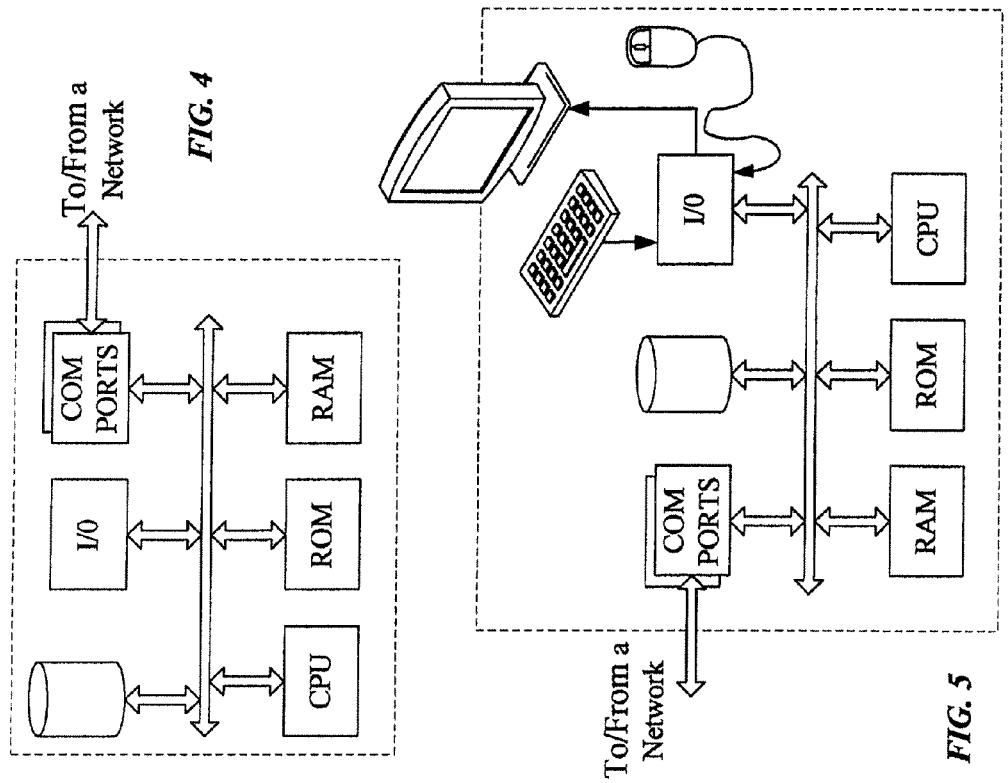
FIG. 4
FIG. 5
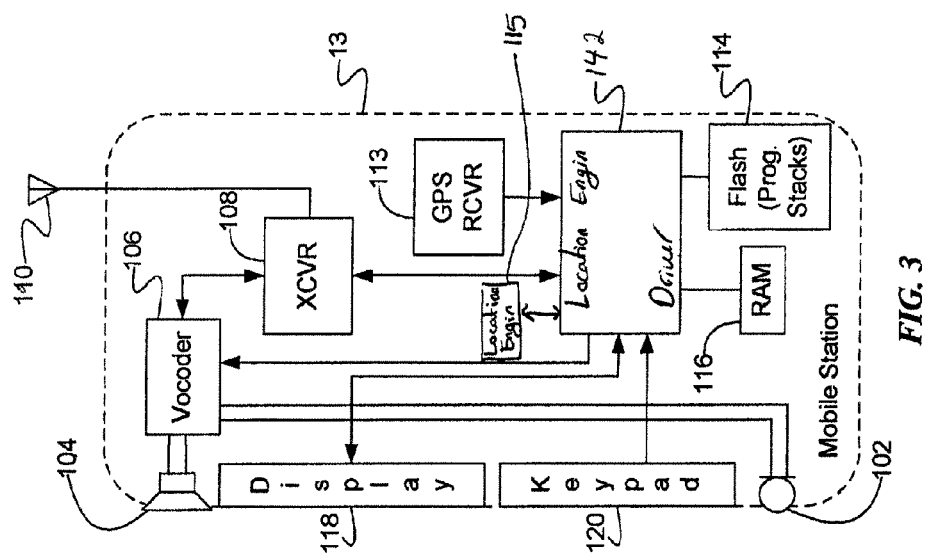
FIG. 3

OPTIMIZING PERFORMANCE OF MULTIPLE LOCATION BASED SERVICE APPLICATIONS THAT ARE RUNNING EITHER ALONE OR SIMULTANEOUSLY ON A WIRELESS DEVICE

TECHNICAL FIELD

The present subject matter relates to mobile device technologies to enable the device to optimally select between different location fix modes for providing location and location related information to Location Based Service (LBS) applications.

BACKGROUND

The Global Positioning System (GPS) location technology has been ubiquitous in wireless devices for several years now. Unfortunately, location determination using standalone GPS fix mode has issues such as long time to first fix and low or no yield indoors and in dense urban environments. Recently, there have been significant breakthroughs in enhanced location technologies using network assistance. These enhanced location technologies have the advantage of shorter time to fix, and in particular the time to first fix, as well as an accurate location determination in urban and in particular dense urban environments.

However, these enhanced location technologies may not be made available to all LBS applications, even though they may be running on the same device. For example, some LBS applications may not meet all user privacy criteria and therefore may not be considered trustworthy to use the carrier's server. Hence, the carrier server may allow the LBS application to request only fixes using the Standalone GPS mode of operation. Also, for tracking mode of operation, it is more efficient to use network assisted, but device computed GPS mode (or Device-Based Mode) rather than device assisted, but network computed GPS mode (or Device-Assisted Mode). Hence, LBS applications in tracking mode would request the device based mode either explicitly or by specifying in the fix request that the Location Engine should minimize the power consumption and/or WWAN bandwidth usage.

The point that is to be made therefore is that when there are multiple simultaneously running LBS applications, requesting fixes using different modes of operation, it becomes challenging to schedule processing for these requests so that the location engine can provide a result quickly and efficiently in response to each request. The common practice has been to use a simple First In First Out (FIFO) queue or to use a mode based priority. Unfortunately, both of these schemes have drawbacks in the form of bad user experience. In the first case, the response will not come quickly and power consumption and WWAN bandwidth usage may be inefficient. In the second case, some applications may be starved or may have to wait a long time for a response with a requested location fix.

Therefore, there is a need for a method and system to enable a mobile device to optimally select between different location fix modes so that requests are honored in the order in which they are received while at the same time optimizing for time of response, power consumption and/or WWAN bandwidth usage.

SUMMARY

In one general aspect, a disclosed method includes steps of receiving requests for location fix for a mobile device from one or more Location Based Service (LBS) applications, and queuing the received requests in a First In First Out (FIFO) queue in the mobile device. Based on information in a first request out of the FIFO queue, a location engine of the mobile device runs in a first fix mode to obtain a fix on the location of the mobile device for a response to the first request. While the location engine is running to obtain the fix for the response to the first request, information in a second request in the FIFO queue is analyzed to determine a second fix mode for response to the second request. Based on a comparison of the second fix mode to the first fix mode, the information in the second request is changed to correspond to the first fix mode, before output of the second request from the FIFO queue to the location engine.

Examples of the method may include one or more of the following features. The first fix mode may be a standalone global positioning system (GPS) mode, and the second fix mode may be a mobile station assisted GPS mode. Alternatively, the first fix mode may be a mobile station based mode, and the second fix mode is a mobile station assisted GPS mode. The method may further include a step of changing information in the second request back to information to correspond to the second fix mode, before output of the second request from the FIFO queue to the location engine, upon determining that the location engine has not responded to the first request within a predetermined time period. The method may further include a step of changing information in the second request back to information to correspond to the second fix mode, after output of the second request from the FIFO queue to the location engine and upon determining that the location engine has not responded to the second request within a predetermined time period.

The analyzed information in the second request may comprise information specifying the second fix mode and technology type. Alternatively or additionally, the analyzed information in the second request may comprise information specifying requirements for the second fix on the location of the mobile device for a response to the second request.

In another general aspect, a disclosed mobile device includes a transceiver for wireless communication via a mobile communication network; a location engine for determining a fix for a location of the mobile device, wherein the location engine is controllable to determine a location fix using a plurality of different fix modes; a FIFO queue for holding requests for location fix for the mobile device from one or more LBS applications; and a location engine driver. The location engine driver is configured to run the location engine in a first fix mode to obtain a fix on the location of the mobile device for a response to a first request out of the FIFO queue, based on information in the first request. While the location engine is running to obtain the fix for the response to the first request, the location engine driver analyzes information in a second request in the FIFO queue to determine a second fix mode for response to the second request. Based on a comparison of the second fix mode to the first fix mode, the location engine driver may change the information in the second request to correspond to the first fix mode, before output of the second request from the FIFO queue to the location engine.

The exemplary mobile station also may exhibit one or more of the following features. The first fix mode may be a standalone GPS mode, and the second fix mode may be a mobile station assisted GPS mode. The first fix mode may be a mobile station based mode, and the second fix mode may be a mobile station assisted GPS mode. The location engine driver may be further configured to change information in the second request back to information to correspond to the second fix mode, before output of the second request from the FIFO queue to the location engine, upon determining that the location engine has not responded to the first request within a predetermined time period. Alternatively or additionally, the location engine driver may be further configured to change information in the second request back to information to correspond to the second fix mode, after output of the second request from the FIFO queue to the location engine and upon determining that the location engine has not responded to the second request within a predetermined time period.

The analyzed information in the second request may comprise information specifying the second fix mode and technology type. Alternatively or additionally, the analyzed information in the second request may comprise information specifying requirements for the second fix on the location of the mobile device for a response to the second request.

Other concepts relate to unique programming for implementing the technique to optimally select between different location fix modes for providing location and location related information to LBS applications. A product or article of manufacture, in accord with this concept, includes at least one machine-readable medium and information carried by the medium. The information carried by the medium may be executable program code and/or information regarding device location fix mode selection.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a high-level functional block diagram of an exemplary mobile device as may programmed to provide location fixes, including using the fix mode selection technique.

FIG. 4 is a simplified functional block diagram of a computer that may be configured as a host or server, for example, to supply programming to a mobile station like the device of FIG. 3.

FIG. 5 is a simplified functional block diagram of a personal computer or other work station or terminal device.

DETAILED DESCRIPTION

Figure 1:
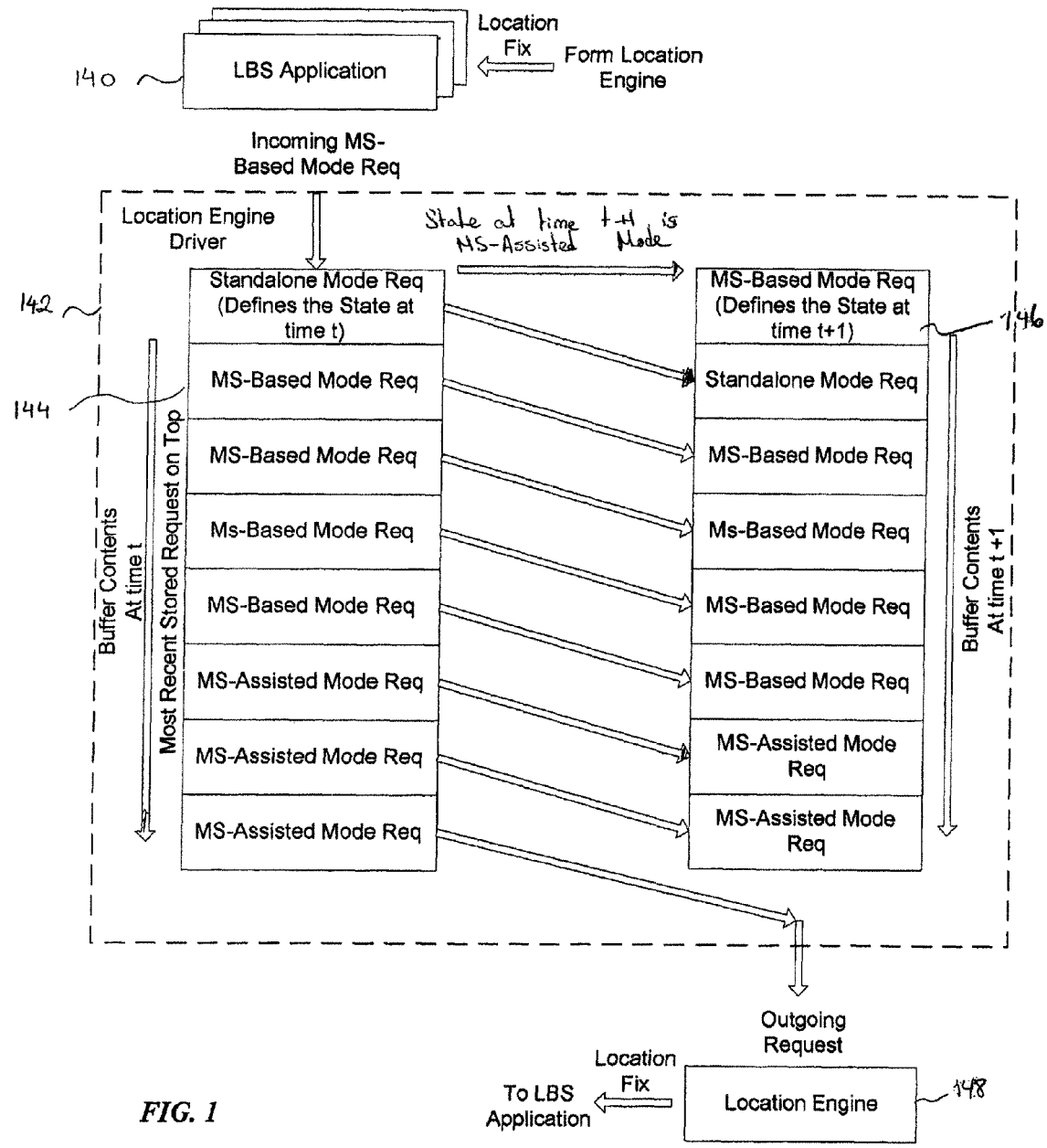
FIG. 1 illustrates location engine state creation, state change and request queuing by the location engine driver, and thus shows the flow of request from location based service applications to the location engine.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure relates to a method for the mobile device to optimally select between different fix modes, e.g., between device assisted GPS, device based GPS, and/or standalone GPS, to provide location and location related information to LBS applications. The method solves one or more of the problems mentioned in the background section by implementing an intelligent FIFO queue, so that requests are honored in the order in which they are received while at the same time optimizing for time of response, power consumption and/or WWAN bandwidth usage. To this end, the method analyzes the next location fix request in the queue and changes that location fix request if appropriate to save power and/or improve performance but otherwise strive to achieve the same result.

To provide one non-limiting example, suppose that an LBS application sends a standalone request to the location engine driver, which forwards the request to the location engine. The location engine now changes from dormant state to the standalone state. Once the location engine replies to the request, it will go back to the dormant state absent another request. However, suppose in the meantime, while the location engine is processing the first request but it has not yet returned the response to the location engine driver, a second request from another application or the same application comes into the location engine driver asking for mobile station assisted fix. In this scenario, the location engine driver places the second request in the buffer while waiting to receive a response to the first request from the location engine before sending the second request to the location engine.

Once the location engine driver receives the response back, the location engine driver realizes that the location engine was in standalone mode and it returned the fix. It also realizes that offering the mobile station assisted mode for the second request may take longer because it has to go to a server for assistance. Therefore, to save time and power processing, the location engine driver may run the second request in the standalone mode. If after a certain amount of time, the location engine driver does not receive a response to the second request, the location engine driver will run the second request in the mobile station assisted mode. The location engine driver may take similar action if the first request were the mobile station based fix mode request instead of standalone fix request and the second request was the mobile station assisted fix mode request.

To this end, in one implementation, this disclosure describes changing mobile station assisted fix mode request initially to standalone fix mode request or mobile station based fix mode request, if the location engine is already processing a standalone fix mode request or a mobile station based fix mode request. This disclosure also describes changing the content of the request to the original mobile station assisted fix mode request if the standalone or mobile station based fix mode request fails.

Reference now is made in detail to the examples illustrated in the accompanying drawings and discussed below. FIG. 1 illustrates location engine state creation, state change and request queuing by the location engine driver, and thus shows the flow of request from location based service applications and the location engine. As shown, a plurality of LBS Applications 140 may issue location fix requests. Each location fix request may be one of a standalone fix mode request, a mobile station based fix mode request, and a mobile station assisted fix mode request.

Typically, location fix requests from the LBS applications are handled by a Location Service Provider (LSP), which in turn may request the service of a GPS Provider for GPS based (either standalone or assisted GPS) location requests. The LSP or the GPS Provider may multiplex location fix requests coming from one or more LBS applications simultaneously or shortly after one another. These location fix requests after multiplexing may be forwarded to the location engine driver 142 sequentially. The location engine driver 142 queues the requests in a FIFO buffer 144. In the example shown in FIG. 1, the location engine driver 142 queues the requests in FIFO buffer 144 such that the most recent request is stored on the top of the buffer 144 and the oldest request is stored in the bottom of the FIFO buffer 144. The FIFO buffer 144 shows the state of the buffer at the time t. At time t in the example, the FIFO buffer 144 includes from oldest (the bottom of the FIFO buffer 144) to the most recent (the top of the FIFO buffer 144), three mobile station assisted mode requests, followed by four mobile station based mode requests, followed by one standalone mode request.

The driver 142 makes a request to the location engine 148 and once it receives a response, it then makes the next request. The FIFO buffer 146 in the example shows the state of FIFO buffer at time t+1 when the oldest request in the FIFO buffer has been forwarded to the location engine 148. As shown, at time t+1, the FIFO buffer 146 includes from oldest (the bottom of the FIFO buffer 146) to the most recent (the top of the FIFO buffer 146), two mobile station assisted mode requests followed by four mobile station based mode requests, followed by one standalone mode request, followed by one mobile station based mode request. The state of location engine driver may be defined by the oldest request (with or without modification) that is going out from the driver 142 to the location engine 148. For example, as shown, at time t, the state of the location engine driver 142 is mobile station assisted mode. Similarly, at time t+1, the state of the location engine driver 142 is mobile station assisted mode.

The location engine 148 may process one request at a time. In one implementation, the optimization technique deals with the way the location engine driver 142 handles these requests and manages the queue, in an optimal fashion for enhanced user experience in terms of delay and power optimization as well as WWAN bandwidth usage. The manner in which location engine 148 handles the location fix mode requests is explained through a state diagram 200 shown in FIG. 2.

Figure 2:
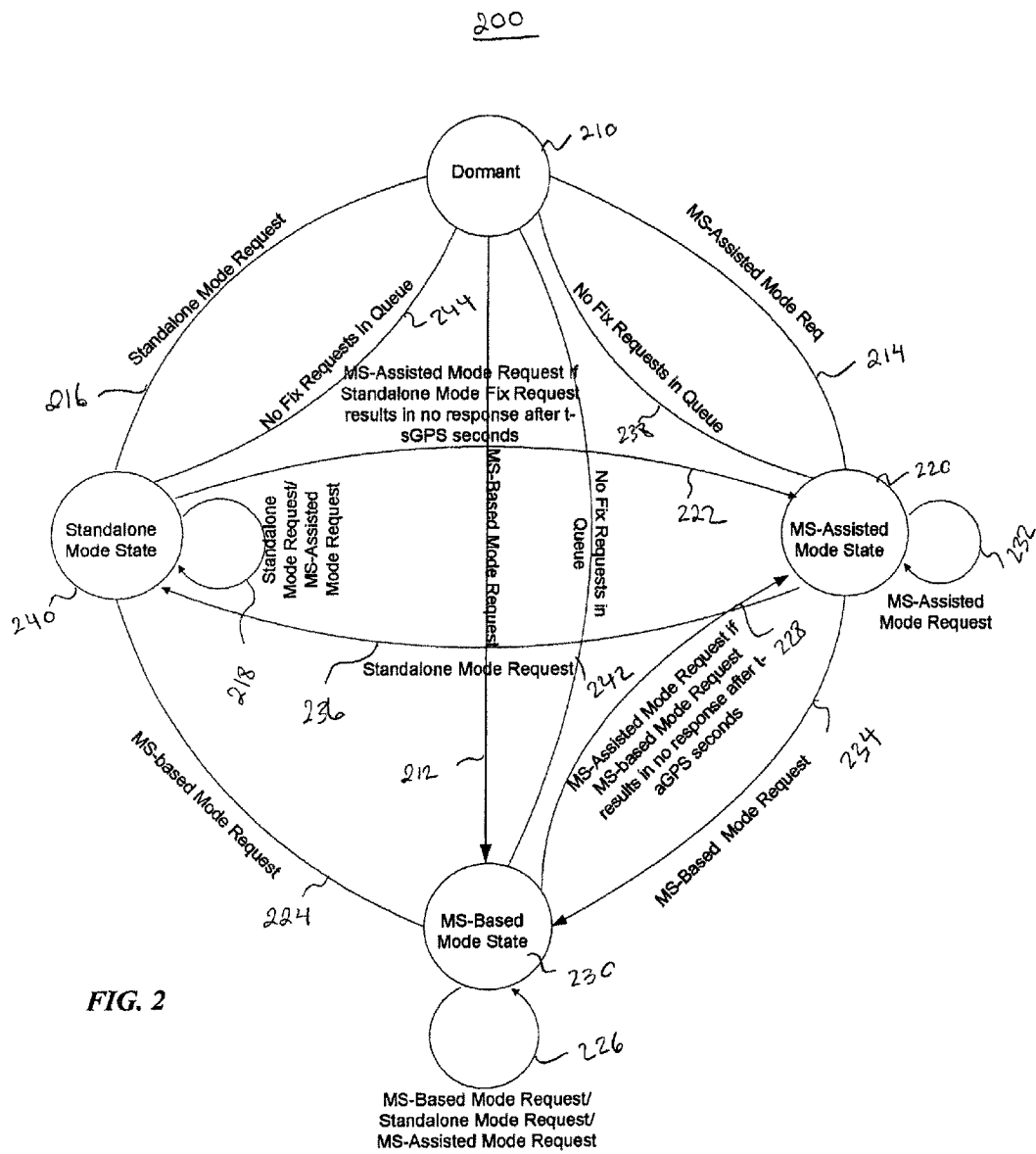
FIG. 2 is a state machine diagram showing a manner in which the location engine driver shown in FIG. 1 controls the operation of the location engine also shown in FIG. 1.

As shown in FIG. 2, the location engine 148 has four mode states: dormant mode state 210, mobile station (MS) assisted mode state 220, MS based mode state 230, and standalone mode state 240. At any given time, the location engine 148 is in one of the fours states based on the presence or absence of the fix mode request and its corresponding type. For example, if the location engine 148 is not servicing any fix mode request, the location engine 148 will be in dormant mode state 210. If the location engine 148 is servicing a MS assisted fix mode request, the location engine 148 will be in the MS assisted mode state 220. If the location engine 148 is servicing a MS based fix mode request, the location engine 148 will be in the MS based mode state 230. If the location engine 148 is servicing a standalone fix mode request 240, the location engine 148 will be in the standalone mode state 240.

If the location engine 148 is in the dormant state 210 and the location engine driver 142 receives a MS based fix mode request, then the location engine driver 142 may send a MS based fix mode request to the location engine 148. In this scenario, the state of the location engine 148 changes from the dormant state 210 to the MS based mode state 230 (Step 212). If the location engine 148 is in the dormant state 210 and the location engine driver 142 receives a MS assisted fix mode request, then the location engine driver 142 may send a MS assisted fix mode request to the location engine 148. In this scenario, the state of the location engine 148 may change from the dormant state 210 to the MS assisted mode state 220 (Step 214). If the location engine 148 is in the dormant state 210 and the location engine driver 142 receives a standalone fix mode request, then the location engine driver 142 may send a standalone fix mode request to the location engine 148. In this scenario, the state of the location engine 148 may change from the dormant state 210 to the standalone mode state 240 (Step 216).

While the location engine 148 is in a state other than the dormant state 210, the location engine driver 142 may receive another fix mode request (e.g., a second fix mode request) from the same LBS application associated with the current request or from another LBS application. As noted previously, the location engine driver 142 may queue the received requests in FIFO queue 144 in the mobile device. While the location engine 148 is running to obtain the fix for the response to the first request, the location engine driver 142 may analyze information in a second request in the FIFO queue 144 to determine a second fix mode for response to the second request. The analyzed information in the second request may include information specifying the second fix mode and technology type. Alternatively or additionally, the analyzed information in the second request may include information specifying requirements for the second fix on the location of the mobile device for a response to the second request. Based on a comparison of the second fix mode to the first fix mode, the location engine driver 142 may change the information in the second request to correspond to the first fix mode, before output of the second request from the FIFO queue 144 to the location engine 148.

To illustrate one non-limiting example, suppose that an LBS application sends a standalone request to the location engine driver 142, which forwards the request to the location engine 148. The location engine 148 now changes from dormant state 210 to the standalone state 240 (Step 216). Suppose while the location engine 148 is processing the standalone fix mode request but it has not yet returned the response to the location engine driver 142, the location engine driver 142 receives a second request asking for MS assisted fix (Step 218). In this scenario, the location engine driver 142 places the second request in FIFO queue 144 while waiting to receive a response to the first request from the location engine 148 before sending the second request to the location engine 148.

Once the location engine driver 142 receives the response back from the location engine 148, the location engine driver 142 may realize that the location engine 148 was in standalone mode and it returned the fix. The location engine driver 142 may also realize that offering the MS assisted mode for the second request may take longer because it has to go to a server for assistance. Therefore, to save time and power processing, the location engine driver 142 may run the second request in the standalone mode. If after a certain amount of time, however, the location engine driver 142 does not receive a response to the second request, the location engine driver 142 may change the type of fix mode in the second request back to the MS assisted fix mode (e.g., the original mode) and may again send the second request to the location engine 148. In this scenario, the state of location engine 148 may change from the standalone mode state 240 to the MS assisted mode state 220 (Step 222). The certain amount of time may be user configurable.

In a slightly different implementation, the location engine driver 142 may determine that the location engine 148 has not responded to the standalone fix mode request within a predetermined time period. In this scenario, the location engine driver 142 may change type of fix mode in the second request back to the MS assisted fix mode (e.g., the original mode), before output of the second request from the FIFO queue 144 to the location engine 148.

Moving forward, if the location engine 148 is in the standalone mode state 240 and the location engine driver 142 receives a MS based fix mode request, then the location engine driver 142 may send a MS based fix mode request to the location engine 148. As a result, the state of the location engine 148 changes from the standalone mode state 240 to the MS based mode state 230 (Step 224). If the location engine 148 is in the MS based mode state 230 and the location engine driver 142 receives a MS based, a standalone, or a MS assisted fix mode request, the driver 142 may send a MS based fix mode request to the location engine 148. As such, the location engine 148 may remain in the MS base mode state 230 (Step 226).

If the location engine 148 is in the MS based mode state 230 and the request is a MS assisted fix mode request, after a certain amount of time, if the location engine driver 142 does not receive a response to the MS assisted fix mode request, the location engine driver 142 may change the type of fix mode in the MS assisted fix mode request back to the MS assisted fix mode (e.g., the original mode) and may send the MS assisted fix mode request to the location engine 148. The certain amount of time may be user configurable. Similarly, the location engine driver 142 may determine that the location engine 148 has not responded to the MS based fix mode request within a predetermined time period. In this scenario, the location engine driver 142 may change type of fix mode in the MS assisted fix mode request back to the MS assisted fix mode (e.g., the original mode), before outputting the MS assisted fix mode request from the FIFO queue 144 to the location engine 148. In either case, the state of the location engine 148 may change from the MS based mode state 230 to the MS assisted mode state 220 (Step 228).

If the location engine 148 is in the MS assisted mode state 220, and the location engine driver 142 receives a MS assisted fix mode request, then the driver 142 may send the MS assisted fix mode request to the location engine 148. In this scenario, the state of the location engine 148 remains the same (Step 232). If the location engine 148 is in the MS assisted mode state, and the location engine driver 142 receives a MS based fix mode request, then the driver 142 may send a MS based fix mode request to the location engine 148. In this scenario, the state of the location engine 148 changes from the MS assisted mode state 220 to the MS based mode state 230 (Step 234). If the location engine 148 is in the MS assisted mode state 220, and the location engine driver 142 receives a standalone fix mode request, then the driver 142 may send a standalone fix mode request to the location engine 148. In this scenario, the state of the location engine 148 changes from the MS assisted mode state 220 to the standalone mode state 240 (Step 236).

If there are no pending requests, the location engine 148 will transition to the dormant state from the existing fix mode state (Steps 238, 242, 244). In one implementation, this location engine driver changes the mobile station assisted fix mode request initially to the standalone fix mode request or mobile station based fix mode request, if the location engine is already in standalone fix mode request or mobile station based fix mode request. The location engine driver changes the content of the request to the original mobile station assisted fix mode request if the standalone or mobile station based fix mode request fails.

Those skilled in the art presumably are familiar with the structure, programming and operations of the various types of mobile stations. However, for completeness, it may be useful to consider the functional elements/aspects of an exemplary mobile station, at a high-level.

For purposes of such a discussion, FIG. 3 provides a high-level functional block diagram of an exemplary mobile device as may programmed to provide location fixes, including using the fix mode selection technique. Although the mobile station 13 may be a smart-phone or may be incorporated into another device, such as a personal digital assistant (PDA) or the like, for discussion purposes, the illustration shows the mobile station 13 is in the form of a handset. The handset embodiment of the mobile station 13 functions as a normal digital wireless telephone station. For that function, the mobile station 13 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13 also includes at least one digital transceiver (XCVR) 108. Today, the mobile station 13 would be configured for digital wireless communications using one or more of the common network technology types. The concepts discussed here encompass embodiments of the mobile station 13 utilizing any digital transceivers that conform to current or future developed digital wireless communication standards. The mobile station 13 may also be capable of analog operation via a legacy network technology.

The transceiver 108 provides two-way wireless communication of information, such as vocoded speech samples and/or digital information, in accordance with the technology of the network. The transceiver 108 also sends and receives a variety of signaling messages in support of the various voice and data services provided via the mobile station 13 and the communication network. The data services here include communications through the Internet, for example, those with a navigation server. Each transceiver 108 connects through RF send and receive amplifiers (not separately shown) to an antenna 110. The transceiver may also support various types of mobile messaging services, such SMS, enhanced messaging service (EMS) and/or multimedia messaging service (MMS).

The mobile station 13 includes a display 118 for displaying messages, menus or the like, call related information dialed by the user, calling party numbers. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during navigation. For example, the user might activate keys of keypad 120 for appropriate user inputs, e.g. to select turn by turn navigation from the place message when shown on the display 118. The display 118 and/or the speaker 104 may be used to provide the actual presentation of the directions to the customer via the mobile station 13, as the customer navigates to the store.

The wireless device 13 also includes a GPS receiver 113. The GPS receiver 113 may be used to identify the location of the wireless device 101 in real time as the customer travels about. The wireless device 13 also include a location engine 115 for determining a fix for a location of the mobile device. The location engine 115 may be controllable via a location engine driver 142 to respond to location fix requests from one or more LBS application.

The location engine driver 142 serves as a programmable controller for the mobile station 13, in that it controls all operations of the mobile station 13 in accord with programming that it executes, for all normal operations, and for operations involved in enabling the procedure under consideration here. In particular, the location engine driver 142 may be configured to (a) run the location engine in a first fix mode to obtain a fix on the location of the mobile device for a response to a first request out of the FIFO queue, based on information in the first request; (b) while the location engine is running to obtain the fix for the response to the first request, analyze information in a second request in the FIFO queue to determine a second fix mode for response to the second request; and (c) based on a comparison of the second fix mode to the first fix mode, change the information in the second request to correspond to the first fix mode, before output of the second request from the FIFO queue to the location engine.

In the example, the mobile station 13 includes flash type program memory 114, for storage of various "software" or "firmware" program routines and mobile configuration settings, such as mobile directory number (MDN) and/or mobile identification number (MIN), etc. The mobile station 13 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memory 114 also stores the navigation client application which enables turn-by-turn navigation via communication with the GPS receiver 113 and the navigation server. The memories 114, 116 also store various data, such as telephone numbers and server addresses, downloaded data such as multimedia content, and various data input by the user. For example, the memories 114, 116 may store LBS applications. Similarly, the memories 114, 116 may store a FIFO queue 144 for holding requests for location fix for the mobile device 13 from one or more LBS applications. Programming stored in the flash type program memory 114, sometimes referred to as "firmware," is loaded into and executed by the microprocessor 142.

As outlined above, the mobile station 13 includes a processor, and programming stored in the flash memory 114 configures the processor so that the mobile station is capable of performing various desired functions, including in this case the functions involved in the technique for providing location fixes.

FIGS. 4 and 5 provide functional block diagram illustrations of general purpose computer hardware platforms. FIG. 4 is a simplified functional block diagram of a computer that may be configured as a host or server, for example, to supply programming to a mobile station like the device of FIG. 3. FIG. 5 is a simplified functional block diagram of a personal computer or other work station or terminal device. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of providing location fixes using a mobile station may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the mobile device. For such communications, software elements may be carried as part of optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium or physical transmission medium. Non-volatile storage media include, for example, optical or magnetic disks, such as any of the storage devices in any computer(s) or the like, such as may be used to implement a technique for providing location fixes on a mobile station. Volatile storage media include dynamic memory, such as main memory of such a computer platform. Tangible transmission media include coaxial cables; copper wire and fiber optics, including the wires that comprise a bus within a computer system. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
   receiving requests for location fix for a mobile device from one or more Location Based Service (LBS) applications;
   queuing the received requests in a First In First Out (FIFO) queue in the mobile device;
   based on information in a first request out of the FIFO queue, running a location engine of the mobile device in a first fix mode to obtain a fix on the location of the mobile device for a response to the first request;
   while the location engine is running to obtain the fix for the response to the first request, analyzing information in a second request in the FIFO queue to determine a second fix mode for response to the second request; and
   based on a comparison of the second fix mode to the first fix mode, changing the information in the second request to correspond to the first fix mode, before output of the second request from the FIFO queue to the location engine.

2. The method of claim 1, wherein:
   the first fix mode is a standalone global positioning system (GPS) mode, and
   the second fix mode is a mobile station assisted GPS mode.

3. The method of claim 1, wherein:
   the first fix mode is a mobile station based mode, and
   the second fix mode is a mobile station assisted GPS mode.

4. The method of claim 1, further comprising changing information in the second request back to information to correspond to the second fix mode, before output of the second request from the FIFO queue to the location engine, upon determining that the location engine has not responded to the first request within a predetermined time period.

5. The method of claim 1, further comprising changing information in the second request back to information to correspond to the second fix mode, after output of the second request from the FIFO queue to the location engine and upon determining that the location engine has not responded to the second request within a predetermined time period.

6. The method of claim 1, wherein the analyzed information in the second request comprises information specifying the second fix mode and technology type.

7. The method of claim 1, wherein the analyzed information in the second request comprises information specifying requirements for the second fix on the location of the mobile device for a response to the second request.

8. A mobile device, comprising:
   a transceiver for wireless communication via a mobile communication network;
   a location engine for determining a fix for a location of the mobile device, wherein the location engine is controllable to determine a location fix using a plurality of different fix modes;
   a First In First Out (FIFO) queue for holding requests for location fix for the mobile device from one or more Location Based Service (LBS) applications; and
   a location engine driver configured to:
      (a) run the location engine in a first fix mode to obtain a fix on the location of the mobile device for a response to a first request out of the FIFO queue, based on information in the first request;
      (b) while the location engine is running to obtain the fix for the response to the first request, analyze information in a second request in the FIFO queue to determine a second fix mode for response to the second request; and
      (c) based on a comparison of the second fix mode to the first fix mode, change the information in the second request to correspond to the first fix mode, before output of the second request from the FIFO queue to the location engine.

9. The mobile device of claim 8, wherein:
   the first fix mode is a standalone global positioning system (GPS) mode, and
   the second fix mode is a mobile station assisted GPS mode.

10. The mobile device of claim 8, wherein:
    the first fix mode is a mobile station based mode, and
    the second fix mode is a mobile station assisted GPS mode.

11. The mobile device of claim 8, wherein the location engine driver is further configured to change information in the second request back to information to correspond to the second fix mode, before output of the second request from the FIFO queue to the location engine, upon determining that the location engine has not responded to the first request within a predetermined time period.

12. The mobile device of claim 8, wherein the location engine driver is further configured to change information in the second request back to information to correspond to the second fix mode, after output of the second request from the FIFO queue to the location engine and upon determining that the location engine has not responded to the second request within a predetermined time period.

13. The mobile device of claim 8, wherein the analyzed information in the second request comprises information specifying the second fix mode and technology type.

14. The mobile device of claim 8, wherein the analyzed information in the second request comprises information specifying requirements for the second fix on the location of the mobile device for a response to the second request.

15. An article of manufacture, comprising:
    a non-transitory, tangible computer readable storage medium; and
    programming embodied in said medium for execution by a processor of a mobile device, wherein the programming configures the processor to implement a location engine driver in the mobile device that is capable of performing functions comprising:
       receiving requests for location fix for a mobile device from one or more Location Based Service (LBS) applications;
       queuing the received requests in a First In First Out (FIFO) queue in the mobile device;
       based on information in a first request out of the FIFO queue, running a location engine of the mobile device in a first fix mode to obtain a fix on the location of the mobile device for a response to the first request;

while the location engine is running to obtain the fix for the response to the first request, analyzing information in a second request in the FIFO queue to determine a second fix mode for response to the second request; and based on a comparison of the second fix mode to the first fix mode, changing the information in second request to correspond to the first fix mode, before output of the second request from the FIFO queue to the location engine.

16. The article of manufacture of claim 15, wherein:

the first fix mode is a standalone global positioning system (GPS) mode, and the second fix mode is a mobile station assisted GPS mode.

17. The article of manufacture of claim 15, wherein:

the first fix mode is a mobile station based mode, and the second fix mode is a mobile station assisted GPS mode.

18. The article of manufacture of claim 15, wherein the programming is for further configuring the processor to change information in the second request back to information to correspond to the second fix mode, before output of the second request from the FIFO queue to the location engine, upon determining that the location engine has not responded to the first request within a predetermined time period.

19. The article of manufacture of claim 15, wherein the programming is for further configuring the processor to change information in the second request back to information to correspond to the second fix mode, after output of the second request from the FIFO queue to the location engine and upon determining that the location engine has not responded to the second request within a predetermined time period.

20. The article of manufacture of claim 15, wherein the analyzed information in the second request comprises information specifying the second fix mode and technology type.

21. The article of manufacture of claim 15, wherein the analyzed information in the second request comprises information specifying requirements for the second fix on the location of the mobile device for a response to the second request.

* * * * *